United States Patent
Conrad

(10) Patent No.: US 6,851,215 B2
(45) Date of Patent: Feb. 8, 2005

(54) FISHING TOOL FOR SNAGGED FISHING LINE

(76) Inventor: Jack W. Conrad, 9234-48th Ave., Kenosha, WI (US) 53142

(*) Notice: Subject to any disclaimer, the term of this patent is extended or adjusted under 35 U.S.C. 154(b) by 0 days.

(21) Appl. No.: 10/437,697

(22) Filed: May 14, 2003

(65) Prior Publication Data

US 2004/0226214 A1 Nov. 18, 2004

(51) Int. Cl.[7] .................. A01K 97/00; B65H 75/00
(52) U.S. Cl. .................. 43/17.2; 43/4; D08/20
(58) Field of Search ........... 43/17.2, 4; 242/405–405.3; D22/117, 118, 149, 199; D8/19, 20, 40, 41, 358

(56) References Cited

U.S. PATENT DOCUMENTS

| | | | | |
|---|---|---|---|---|
| 1,516,522 A | * | 11/1924 | Farr | 242/322 |
| 1,634,436 A | * | 7/1927 | Polson | 242/405.2 |
| 1,901,050 A | * | 3/1933 | Voorhees | 242/405.2 |
| D144,225 S | * | 3/1946 | Teague | D7/693 |
| 2,629,962 A | * | 2/1953 | Lambert | 43/53.5 |
| 3,408,677 A | * | 11/1968 | Yates | 15/236.02 |
| 3,865,370 A | * | 2/1975 | Rogers | 30/165 |
| D257,383 S | * | 10/1980 | Davenport | D22/149 |
| 4,261,529 A | * | 4/1981 | Sandberg et al. | 242/405.2 |
| 4,497,457 A | * | 2/1985 | Harvey | 242/405.1 |
| 4,546,510 A | * | 10/1985 | Harrison | 7/145 |
| 5,201,121 A | * | 4/1993 | Heiberg | 30/123 |
| D345,887 S | * | 4/1994 | Heiberg | D7/376 |
| 5,344,093 A | * | 9/1994 | Cohen | 242/407 |
| D352,426 S | * | 11/1994 | Tucker | D7/696 |
| D362,936 S | * | 10/1995 | Shabel | D32/46 |
| 5,615,509 A | | 4/1997 | Washington | |
| D395,999 S | * | 7/1998 | Schmidt | D8/358 |
| 6,122,831 A | * | 9/2000 | Beckers et al. | 30/314 |
| D437,773 S | * | 2/2001 | Kinn | D8/358 |

* cited by examiner

Primary Examiner—Teri P. Luu
Assistant Examiner—Bret Hayes
(74) Attorney, Agent, or Firm—Jansson, Shupe & Munger, Ltd.

(57) ABSTRACT

A fishing tool having a handle and a body with one or more notches is provided to facilitate wrapping and holding a sufficient length of fishing line around the tool to permit the line to be forcefully pulled from a point of entanglement. The handle can be a grip-aperture defined by the body. In a preferred embodiment, the tool is provided with a beveled lower edge to facilitate using the tool to slice bait. A method for releasing a snagged fishing line is also disclosed.

6 Claims, 3 Drawing Sheets

FISHING TOOL FOR SNAGGED FISHING LINE

FIELD OF THE INVENTION

This invention relates generally to fishing tools and, in particular, to fishing tools for releasing snagged fishing lines.

BACKGROUND OF THE INVENTION

Fishermen have long recognized that fishing the depths of most bodies of water can be rewarding since more fish are known to inhabit the bottom of these locations than the surface. The rocks, vegetation, and various debris that invest this region of a stream, lake, or pond serve as a welcome habitat for many fish.

The very reason this environment is so inviting to a fish is why, however, fishing deep below the surface can also be so challenging. Many a fishing line has become caught or snagged when its hook, lure or other tackle gets entangled on a sunken tree limb or patch of submerged weeds.

While cutting the line is always an option, most fishermen prefer at least attempting to free the snagged tackle by pulling and jerking on the line. The problem is that some fishing lines, especially cable or braided lines, are very strong. This presents the potential of causing serious cuts and lacerations to the unprotected and uncovered fingers, hands and arms of a fisherman attempting to physically exert the required tension on these lines. There is a need, therefore, for a tool that will allow the fisherman to attempt to dislodge a snagged fishing line without subjecting himself unnecessarily to a risk of accidental injury from such activity.

OBJECTS OF THE INVENTION

It is a primary object of this invention to provide a fishing tool that facilitates the forceful pulling of a snagged fishing line from its point of entanglement by utilizing at least one notch on the tool.

Another object of this invention is to provide a fishing tool to disengage snagged fishing line that is easy to handle.

Another object of the invention is to provide a novel fishing tool that permits a fisherman to forcefully pull on a snagged fishing line without his hands having to directly contact the line so as to minimize the risk of injury to hands and arms from disengaging such line.

Another object of the invention is to provide an exceptional fishing tool that combines the ability to disentangle fishing line from underwater snags with a means for safely slicing bait.

Another object of the invention is to provide an improved fishing tool that is simple to manufacture and yet highly reliable to use.

Another object of the invention is to provide a method for safely releasing a fishing line from a snag.

SUMMARY OF THE INVENTION

This invention is for a fishing tool having a body that includes a grip-aperture, an upper edge, a lower edge, two side edges, first and second surfaces, and at least one notch sized to receive a fishing line. When a fishing line becomes snagged beneath the surface of the water, at least one notch on the fishing tool enables the fisherman to wrap a sufficient length of the fishing line around the tool so as to enable him to forcefully pull on the line without use of his hands in an effort to pull the line from its point of entanglement.

As used herein, the term "notch" refers to a groove or indentation in the body of the fishing tool sized to receive and hold a fishing line so that a portion of the line can be securely wrapped around the body. The portion of line capable of being securely held by the notch is limited to only the length necessary to enable the fisherman to forcefully pull on the line.

The term "grip-aperture" refers to any open space defined by the body of the fishing tool capable of use as a handle on the tool. This open space need not be entirely surrounded by portions of the body.

In a preferred embodiment, the fishing tool has a body that is substantially planar whereby the first and second surfaces are substantially level and parallel to each other. It is more preferred that the body have at least two notches, each side edge having at least one of the notches. Most preferred is that one notch be substantially opposite another notch, i.e. in registry with the other by both notches being on a line parallel with the upper edge.

In a highly preferred embodiment, the notches are substantially orthogonal to the respective side edge wherein a line parallel with the side edge is substantially perpendicular with an axis line for the corresponding notch. It is most desired that each notch have sidewalls that are perpendicular to the corresponding side edge of the body and a bottom that is curved.

One very desirable embodiment is where the notches extend downward, i.e. at an acute angle to the plane of the side edge directed towards the lower edge and away from the grip-aperture. In this embodiment, the axis for each notch crosses the body of the tool in a direction that approaches the lower edge and not the grip-aperture.

In another highly preferred embodiment, the lower edge of the fishing tool is curved from side edge to side edge so as to form an arc. The lower edge furthermore exhibits beveled surfaces. It is most preferred in this embodiment that the lower edge be beveled on only one of its two surfaces. Having a beveled edge, the fishing tool can be used to cut or slice bait in an effective and safe manner.

In another aspect of this invention, it provides a method for safely releasing a fishing line on a fishing rod from a snag or entanglement. This novel method comprises the steps of (a) providing a fishing tool having a handle and a body with at least one notch; (b) gripping the handle of the tool; (c) inserting the line into a notch on the tool; (d) providing slack or a lack of tension in the line between the tool and the rod; (e) wrapping the line around at least one circumference of the body by inserting another point on the line into a notch on the tool; and then (f) pulling firmly on the handle until the snagged line is released. The term "circumference" as used herein refers to substantially circumscribing the surface of the body with a loop of the line.

It is preferred that the step of wrapping the line around the body of the tool be repeated until a substantial amount of the slack in the line is gone, resulting in a portion of the line being securely wrapped around the tool. A most preferred embodiment of this method is performed where the handle is a grip-aperture formed by the body of the tool. In this embodiment, the gripping step of the method includes placing at least two fingers into the grip-aperture.

A highly preferred embodiment of this method is performed where the body has at least two notches and where one of the notches is on the tool opposite from another notch. The term "opposite" as used herein refers to an orientation where the two notches lie on a line that is perpendicular to the vertical axis of the body. It is most desired in this embodiment that tool be substantially planar and have at least two side edges where each edge has a notch substantially orthogonal to it.

An alternative aspect of this invention is for a fishing tool comprising a handle and a body where the body includes a sidewall having at least one notch. The notch is sized to receive a fishing line to enable the tool to wrap and hold sufficient line around itself so that force can safely be placed on the line to pull it from a point of entanglement.

A preferred embodiment of this device is where the handle is integral with the body. The term "integral" as used herein refers to the handle being substantially continuous with the body by forming the tool from members intended to be permanently joined together. It is most preferred that the handle be a grip-aperture.

In another desired embodiment, the body has a curved and beveled lower edge, preferably beveled on just one surface. It is highly desired in this embodiment that the body be substantially planar. It is most preferred that the body have at least two notches, one notch substantially opposite another and each notch orthogonal to the sidewall. Also highly preferred is where the body has at least two notches with one notch opposite another and each notch extending downwards in a direction away from the handle.

DETAILED DESCRIPTION OF PREFERRED EMBODIMENTS

Figure 1:
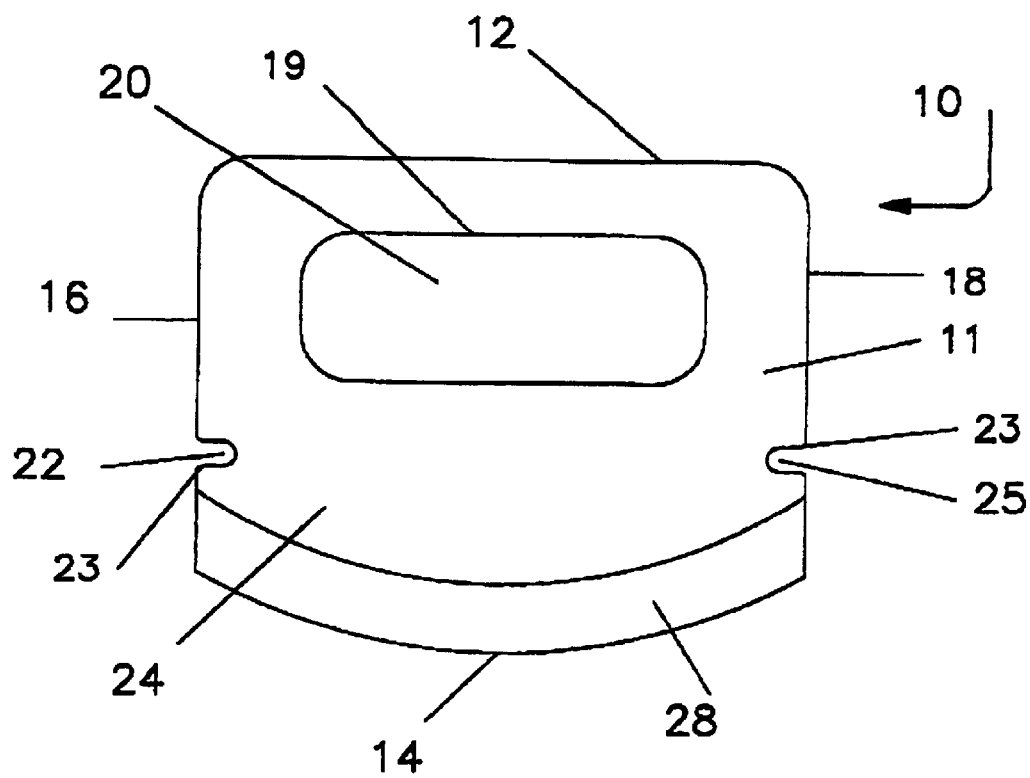
FIG. 1 is a front view of a preferred fishing tool in accordance with this invention.

FIG. 1 shows a fishing tool 10 in accordance with this invention. Fishing tool 10 has a body 11 that includes an upper edge 12, a beveled lower edge 14 and first and second side edges 16, 18. Fishing tool 10 is also provided with a handle 19 in the form of a grip-aperture 20 spaced inward from upper edge 12 and sized to accommodate at least two fingers when held by the user.

Two notches 22 are spaced below grip-aperture 20, one along each side edge 16, 18. In the preferred embodiment illustrated by FIG. 1, notches 22 have flat and parallel notch-sidewalls 23 and a rounded bottom 25. Bottom 25 presents a curved profile.

As can be seen in FIG. 1, each notch 22 is substantially at a right angle with respect to corresponding side edge 16, 18. An orthogonal orientation for notches 22 with respect to side edges 16, 18 is highly preferred because it facilitates quicker release of line 30 from tool 10 after the line has been dislodged from its snag.

As further seen in FIG. 1, notches 22 are in registry with each other, i.e. notches 22 define a line that is substantially parallel to upper edge 12. Although notches 22 can be sized to receive and hold a sufficient length of fishing line to enable a fisherman to forcefully pull on the line, a notch having a width of 0.125 inches and a depth of 0.18 inches has been found to be satisfactory.

Figure 2:
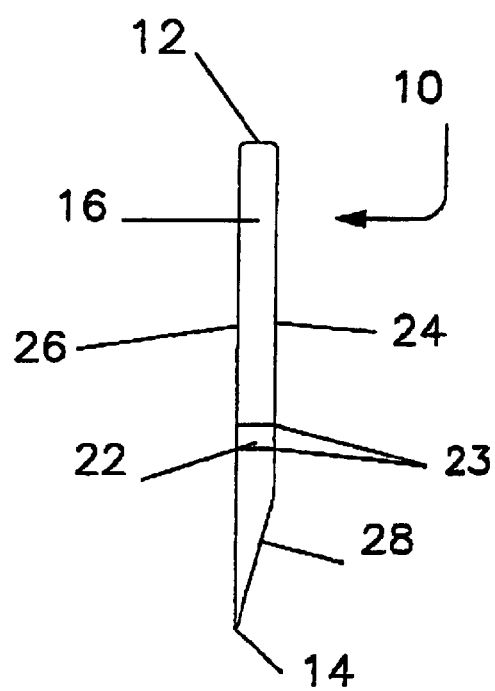
FIG. 2 is a side view of the fishing tool of FIG. 1.

FIG. 2 illustrates that fishing tool 10 is preferably planar with a first surface 24 substantially parallel with a second surface 26. Body-sidewall 27 includes both surfaces 24, 26 and both side edges 16, 18. Lower edge 14 is provided with a bevel surface 28 on first surface 24. The beveled surface is preferably at a 15° angle.

In operation, an individual grasps tool 10 by inserting two or three of his fingers into grip-aperture 20 to pinch upper edge 12 against his hand and by pinching one of side edges 16, 18 with his thumb. With tool 10 in hand, a snagged fishing line 30 is placed within either one of notches 22A, 22B. If inserted into notch 22A, slack is next generated in line 30 between the end of the fishing rod (not shown) and notch 22A. Sufficient slack is created to allow the fisherman to then proceed in wrapping a portion of line 30 around body 19.

One approach to wrapping line 30 around tool 10 is through looping a portion of the slackened line around body-sidewall 27 by threading that line into opposite notch 22B before returning to notch 22A as tool 10 is held stationary. Another approach is to first pull the slackened line at an angle to the taut portion of line 30, i.e. the portion between tool 10 and the snag, so that the slackened line is drawn firmly against notch-sidewall 23 of notch 22A. Tool 10 is then rotated over the taut line in the direction of the snag. In this manner, line 30 is threaded first into opposite notch 22B before returning to notch 22A so as to loop line 30 around body-sidewall 27.

Figure 3:
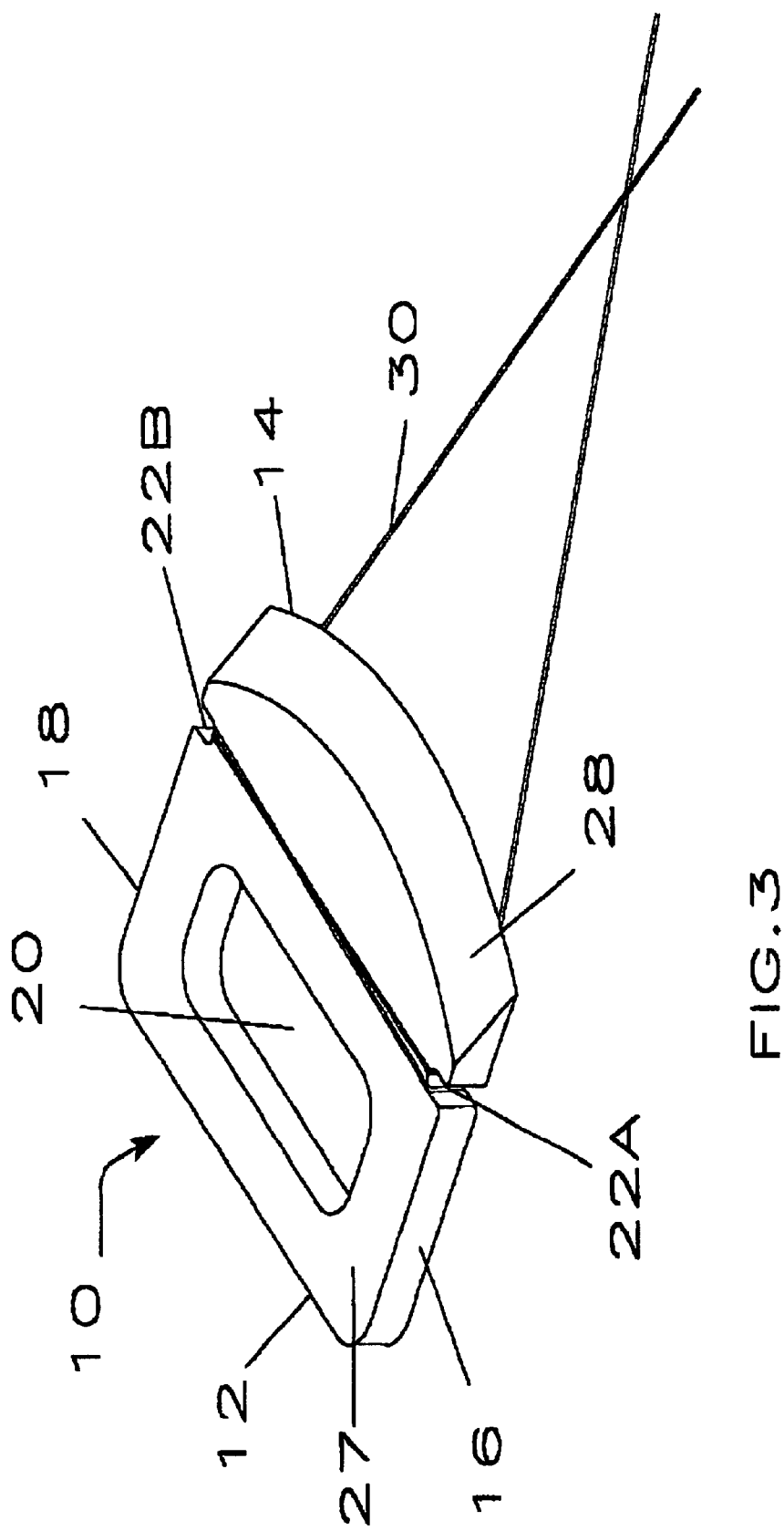
FIG. 3 is a perspective view of the fishing tool showing fishing line wrapped around the tool in accordance with this invention.

Either approach is repeated until, as shown in FIG. 3, sufficient line has been secured so that the fisherman can safely attempt to dislodge line 30 from its entanglement by firmly pulling on line 30 with tool 10. As further illustrated in FIG. 3, it is preferable that the wrapping process conclude with a half-loop so that line 30 enter and exit tool 10 via different notches 22A, 2213. Since line 30 is kept between the fisherman's hand and the snag, there is little risk of line 30 cutting into his fingers or arm.

Figure 4:
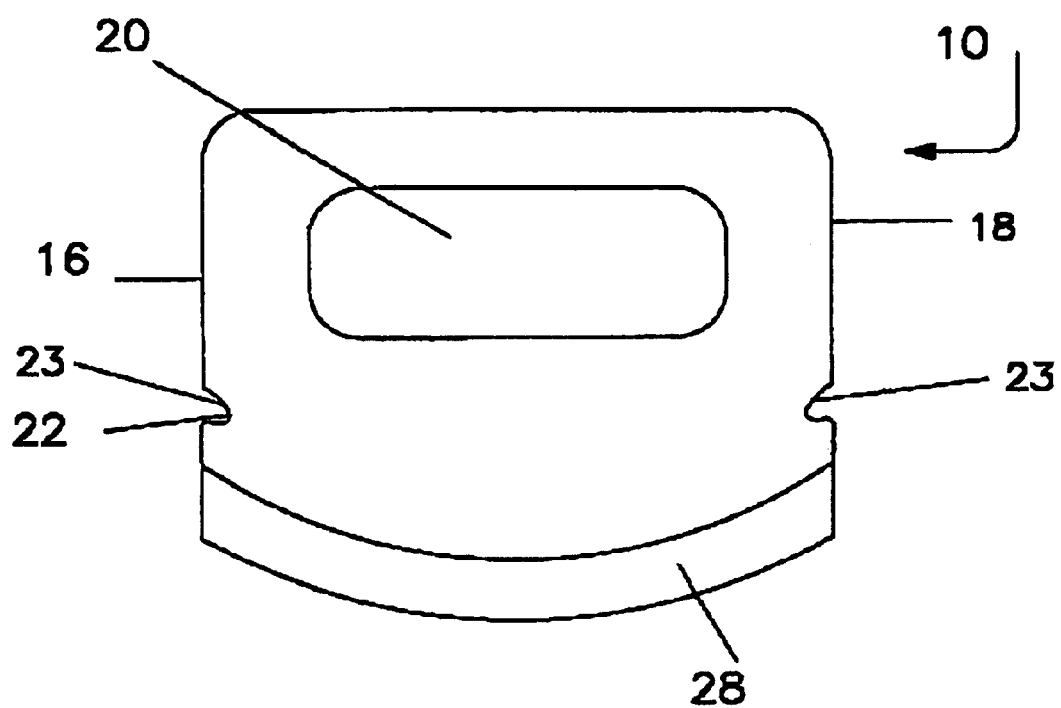
FIG. 4 is a front view of a fishing tool in accordance with this invention with downward extending notches.

FIG. 4 illustrates another desirable embodiment for notches 22. FIG. 4 shows notches 22 having a profile with curved notch-sidewalls 23 and that extends from the side edges 16, 18 in a direction downward and away from grip-aperture 20.

Fishing tool 10 also permits the user to effectively and efficiently slice bait such as worms or minnows into two or more pieces without requiring use of a knife or other sharp object. Bait is placed on a flat surface and with tool 10 substantially perpendicular to the surface, lower edge 14 is rolled in a back and forth action across the bait at a point where the slicing is desired. Lower edge 14 makes a clean cut in the bait with little loss of viscera. This avoids for fishermen the clean-up associated with the tearing of bait into multiple portions by hand. Since tool 10 is preferably made from plastic in a manner known to those skilled in the art, use of tool 10 to slice bait avoids the risk of injury from having a sharp object such as a knife in a confined area such as a boat. This is especially important where children may be present or the working space for each fisherman is limited.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A fishing tool comprising a monolithic planar body, the body having an upper edge, a grip-aperture defined by the body adjacent to the upper edge, the grip-aperture sized to receive at least two fingers, a curved and beveled lower cutting edge, and two side edges extending linearly between the upper edge and the lower edge, the side edges each having at least one notch therein, each notch sized to receive a fishing line and positioned between the grip-aperture and the lower edge, wherein the notches facilitate wrapping and holding a sufficient length of fishing line around the fishing tool so as to permit the line to be forcefully pulled from a point of entanglement.

2. The fishing tool of claim 1 wherein the body has a first surface and the lower edge is beveled on only the first surface.

3. The fishing tool of claim 1 wherein the notches are located substantially opposite one another.

4. The fishing tool of claim 3 wherein the notches extend downward.

5. The fishing tool of claim 3 wherein the notches each is substantially orthogonal to the side edges, respectively.

6. The fishing tool of claim 5 wherein the notches each have two substantially parallel sidewalls and a substantially curved bottom.

* * * * *